(12) United States Patent
Yamada (10) Patent No.: US 10,788,118 B2
(45) Date of Patent: Sep. 29, 2020

(54) LIQUID STORAGE CASE

(71) Applicant: Honda Motor Co., Ltd., Tokyo (JP)

(72) Inventor: Satoshi Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/782,863

(22) Filed: Feb. 5, 2020

(65) Prior Publication Data

US 2020/0256454 A1 Aug. 13, 2020

(30) Foreign Application Priority Data

Feb. 8, 2019 (JP) .................................. 2019-021131

(51) Int. Cl.
*F16H 57/04* (2010.01)
*F16H 57/037* (2012.01)

(52) U.S. Cl.
CPC ....... *F16H 57/0423* (2013.01); *F16H 57/037* (2013.01)

(58) Field of Classification Search
CPC ............................ F16H 57/0423; F16H 57/037
See application file for complete search history.

(56) References Cited

U.S. PATENT DOCUMENTS

| 4,471,668 A * | 9/1984 | Elsner ................ B60K 6/105 180/165 |
| 2004/0226766 A1* | 11/2004 | Cook ................ B60K 17/344 180/233 |
| 2015/0128738 A1* | 5/2015 | Ono ................ F16H 57/0494 74/339 |
| 2017/0082017 A1* | 3/2017 | Nowak ............... F01D 17/105 |

FOREIGN PATENT DOCUMENTS

| FR | 2890711 A1 * | 3/2007 | .......... F16C 33/6674 |
| JP | 2000186526 A | 7/2000 | |

* cited by examiner

*Primary Examiner* — Vicky A Johnson
(74) *Attorney, Agent, or Firm* — Duft & Bornsen, PC (57) ABSTRACT

A liquid storage case surrounded by wall surfaces which includes a side surface extending in a vertical direction. The liquid storage case includes an inlet portion disposed on the side surface and including an inlet port through which a liquid is poured, a connecting portion disposed below the inlet portion and connected to an electrical component, and a guide disposed between the inlet portion and the connecting portion to guide the liquid spilled out of the inlet port in a direction away from the connecting portion. The guide includes a plate protruding from the side surface to a more horizontally outward position than a tip end of the inlet portion. The plate includes a first face opposed to the inlet portion, and the first face is disposed along the side surface so as to be inclined downward.

9 Claims, 7 Drawing Sheets

LIQUID STORAGE CASE

CROSS-REFERENCE TO RELATED APPLICATION

This application is based upon and claims the benefit of priority from Japanese Patent Application No. 2019-021131 filed on Feb. 8, 2019, the content of which is incorporated herein by reference.

BACKGROUND OF THE INVENTION

Field of the Invention

This invention relates to a liquid storage case in which a connecting portion is disposed below an inlet port for injecting liquid such as oil.

Description of the Related Art

There have been known liquid storage cases that include an inlet port through which liquid, such as oil, is injected and a connecting portion that is connected to a temperature sensor for detecting the temperature of the liquid injected through the inlet port, a level sensor for detecting the amount of stored liquid, and the like. Such a case is described in, for example, Japanese Unexamined Patent Application Publication No. 2000-186526 (JP2000-186526A).

However, for the case described in JP2000-186526A, the inlet port is disposed above the connecting portion and therefore an electrical failure of the connecting portion may occur if liquid spilled out of the inlet port reaches the connecting portion. While it is conceivable to form an inlet port in a location other than above the connecting portion in order to prevent such a failure, it is very difficult to form an inlet port in such a manner in terms of the layout.

SUMMARY OF THE INVENTION

An aspect of the present invention is a liquid storage case surrounded by wall surfaces which includes a side surface extending in a vertical direction. The liquid storage case includes an inlet portion disposed on the side surface and including an inlet port through which a liquid is poured, a connecting portion disposed below the inlet portion and connected to an electrical component, and a guide disposed between the inlet portion and the connecting portion to guide the liquid spilled out of the inlet port in a direction away from the connecting portion. The guide includes a plate protruding from the side surface to a more horizontally outward position than a tip end of the inlet portion. The plate includes a first face opposed to the inlet portion, and the first face is disposed along the side surface so as to be inclined downward.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Now, an embodiment of the present invention will be described with reference to FIGS. 1 to 8C. A liquid storage case according to an embodiment of the present invention includes an inlet portion into which various types of liquid, including oil, such as lubricating oil or fuel oil, and water are injected, and a connecting portion that connects an electrical component, a harness connected to an electrical component, or the like to a portion below the inlet portion. This liquid storage case can be used as various types of cases. Hereafter, there will be described an example in which this liquid storage case is applied to a case for a transmission included in an electric motor unit forming the power unit of an electric vehicle, that is, an example in which the liquid storage case is used as a transmission case.

Figure 1:
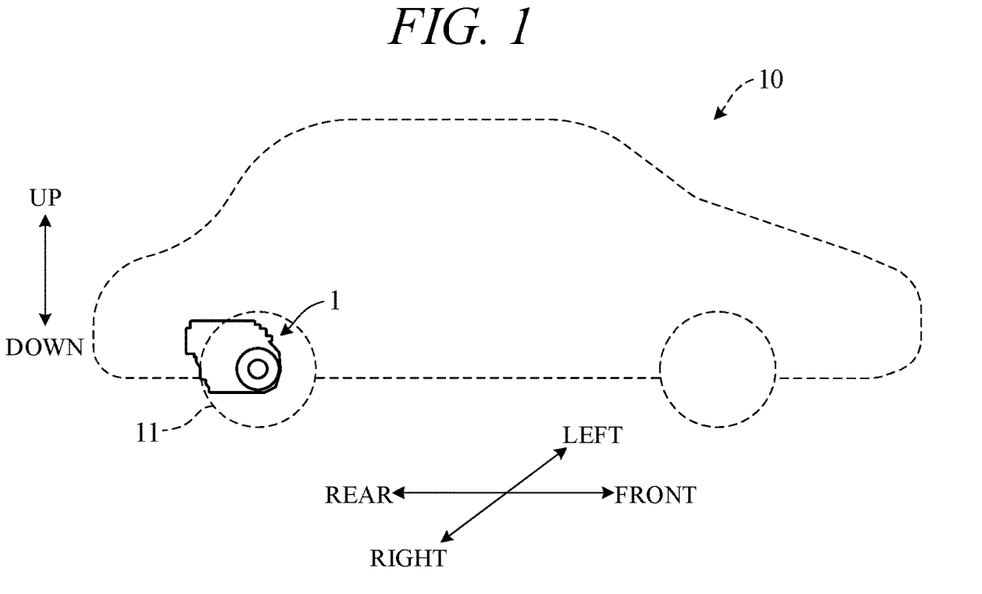
FIG. 1 is a side view schematically showing a state in which a power unit including a liquid storage case according to an embodiment of the present invention is mounted on an vehicle.

FIG. 1 is a side view schematically showing a state in which a power unit 1 including the liquid storage case according to the embodiment of the present invention is mounted on an electric vehicle 10. The front-back direction (length direction), left-right direction (width direction), and up-down direction (height direction) of the electric vehicle 10 are defined as shown in FIG. 1. The configuration of the components will be described below in accordance with these definitions. As shown in FIG. 1, the power unit 1 is disposed on a rear portion of the electric vehicle 10. For example, the power unit 1 is disposed on a rear frame forming a rear portion of the electric vehicle 10 and is connected to a vehicle shaft that couples a pair of left and right drive wheels (rear wheels) 11 of the vehicle.

Figure 2:
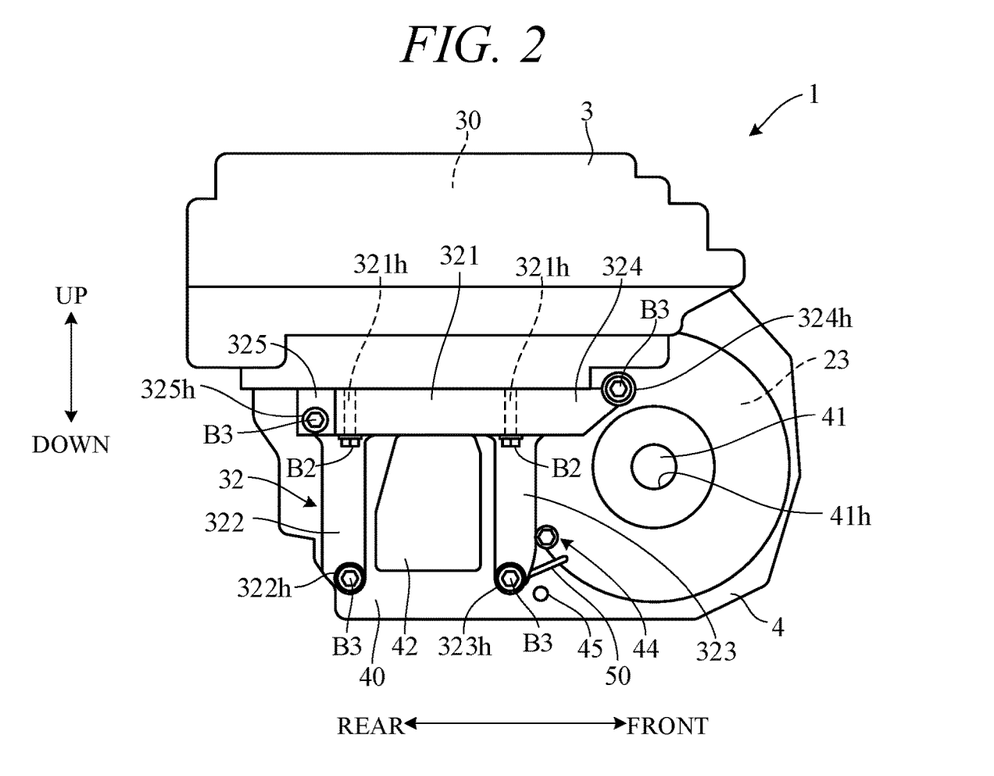
FIG. 2 is a side view schematically showing a state of a power unit seen from the right side.
Figure 3:
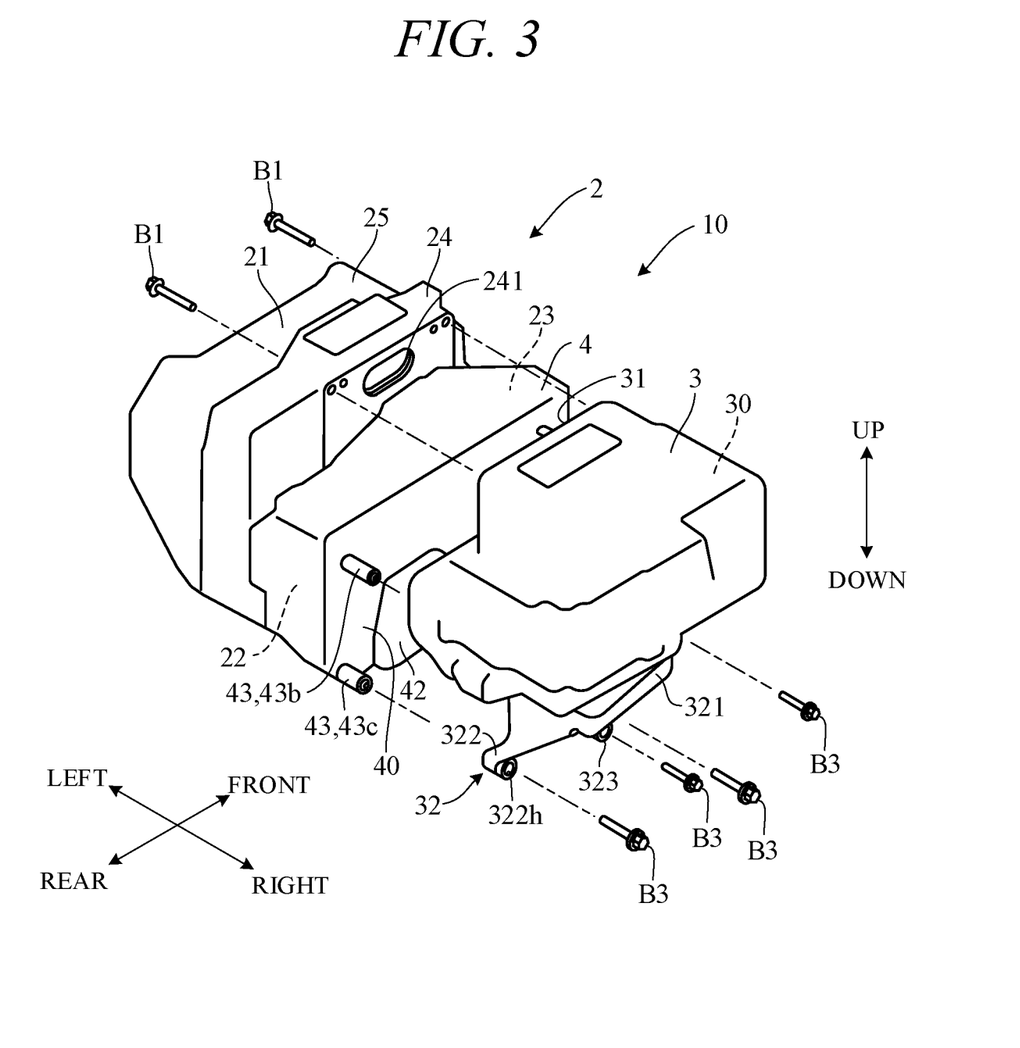
FIG. 3 is an exploded perspective view schematically showing a state of the power unit of FIG. 2 seen obliquely from the rear.

FIG. 2 is a side view schematically showing a state of the power unit 1 seen from the right side. FIG. 3 is an exploded perspective view schematically showing a state of the power unit 1 seen obliquely from the rear. As shown in FIG. 3, the power unit 1 includes an electric motor unit 2 and a controller unit 3 disposed on the right side of the electric motor unit 2. More specifically, the controller unit 3 is mounted on the electric motor unit 2 such that the left end of the controller unit 3 is disposed over the right end of the electric motor unit 2.

The electric motor unit 2 includes an electric motor 21, a transmission 22, and a differential device 23. The electric motor 21 is contained in an electric motor case 25. The transmission 22 and differential device 23 are contained in a transmission case 4 disposed on the right side of the electric motor case 25. A center case 24 is disposed between the electric motor case 25 and transmission case 4. The upper surface of the center case 24 is located above the upper surface of the transmission case 4. The center case 24 has a connected portion 241 on a right end thereof located above the transmission case 4.

The controller unit 3 is a power control unit (PCU) including a controller 30 that controls the electric motor 21. The controller unit 3 includes a power supply 31 that supplies power to the electric motor unit 2. The power supply 31 is disposed on the left end of the controller unit 3. The controller unit 3 is attached to the right end of the center case 24 above the transmission case 4 by a bolt B1 so that the power supply 31 is connected to the connected portion 241. The controller unit 3 is disposed so as to overlap the transmission case 4 when seen from above. Specifically, the left side of the controller unit 3 is located above the transmission case 4, and the right side thereof protrudes to a more right position than the right end surface of the transmission case 4. A bracket 32 is disposed on the bottom surface of the controller unit 3 so as to protrude downward. The controller unit 3 is fixed to the right wall surface (right surface) 40 of the transmission case 4 by the bracket 32.

As shown in FIGS. 2 and 3, the bracket 32 includes a base 321 disposed on the bottom of the controller unit 3 and a pair of front and rear legs 322 and 323 disposed so as to extend downward from the base 321. The base 321 is approximately in the shape of a rectangular plate. Through holes are formed in the four corners of the base 321 in the up-down direction. A bolt B2 passing through a through hole 321h is screwed into a bolt hole formed in a lower portion of the controller unit 3 so that the bracket 32 is fixed to the bottom of the controller unit 3.

The base 321 includes a first extending portion 324 that extends forward and a second extending portion 325 that extends rearward. Through holes 324h and 325h are formed in the first extending portion 324 and second extending portion 325, respectively, in the left-right direction. Through holes 322h and 323h are formed in the lower ends of the pair of legs 322 and 323, respectively, in the left-right direction. Bolts B3 passing through the through holes 322h to 325h are screwed into bosses 43 formed on the transmission case 4 so that the bracket 32 is fixed to the transmission case 4. Thus, the controller unit 3 is fixed to the transmission case 4.

Figure 4:
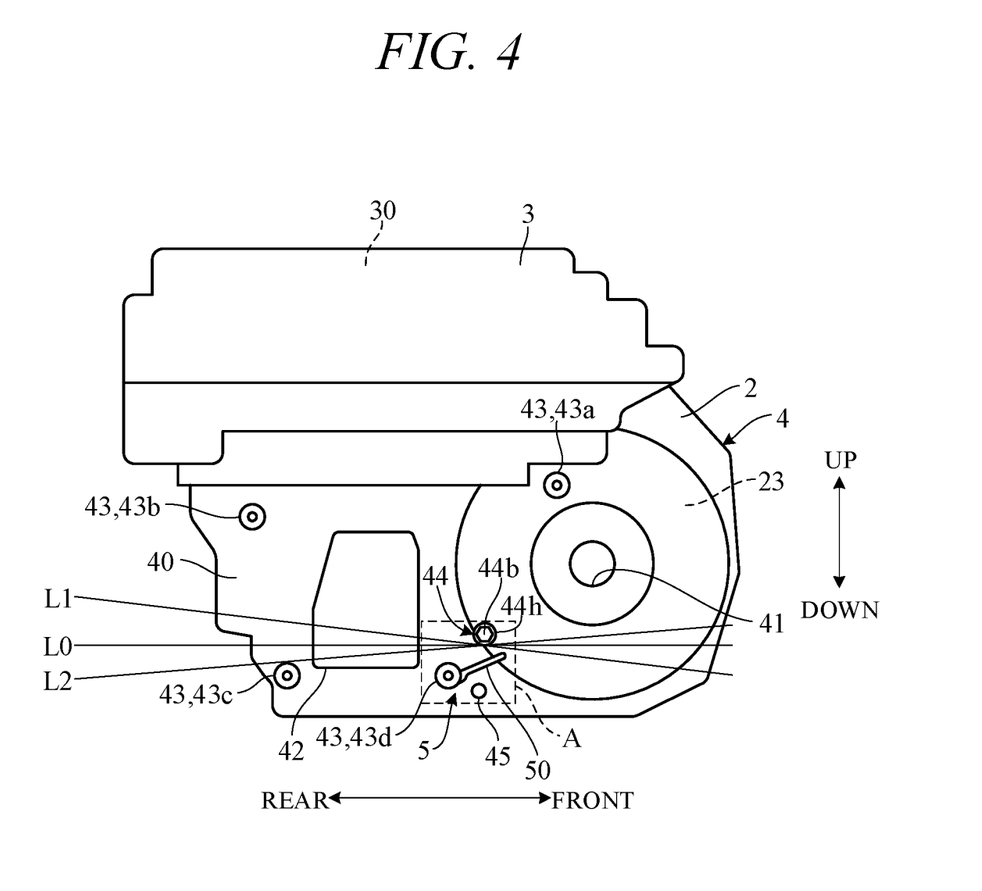
FIG. 4 is a side view showing a state in which a bracket fixed to a controller unit of the power unit of FIG. 2 is removed.

The configuration of the transmission case 4 will be described. FIG. 4 is a side view showing a state in which the bracket 32 is removed from FIG. 2. As shown in FIG. 4, the right surface 40 of the transmission case 4 is provided with an opening 41 through which the vehicle shaft coupled to the right-side drive wheel 11 passes, a motor 42 that drives an oil pump for circulating oil in the transmission case 4, multiple bosses 43 that fix the bracket 32, a boss 44 having an inlet port 44h for injecting oil into the transmission case 4, a connecting portion 45 that includes a connector connected to a temperature sensor for detecting the temperature of oil in the transmission case 4, and a guide 5 that guides oil spilled out of the inlet port 44h in a direction away from the connecting portion 45.

The opening 41 is formed in the center in the up-down direction of a front portion of the right surface 40. In the transmission case 4, the differential device 23 is disposed on the left side of the opening 41, and the transmission 22 is disposed behind the differential device 23. The vehicle shaft passing through the opening 41 is connected to the differential device 23 so that rotation of the differential device 23 is transmitted to the vehicle wheel.

The motor 42 is disposed behind the opening 41 and in the center in the up-down direction of the right surface 40. The motor 42 is approximately in the shape of a box and is detachably mounted on the right surface 40 of the transmission case 4. For example, the motor 42 is used to drive an oil pump in the transmission case 4 during a stop of the vehicle. The motor 42 and oil pump are connected to each other through a shaft. Driving the motor 42 rotates the shaft and thus drives the oil pump.

The bosses 43 are disposed so as to protrude rightward from the right surface 40. The bosses 43 are each approximately in the shape of a cylinder and have bolt holes in the tip ends thereof. The bolts B3 (FIG. 3) for fixing the bracket 32 are screwed into the bolt holes. Reinforcing ribs 43r (see FIG. 5) are connected to the outer circumferential surfaces of the bosses 43.

The bosses 43 include four bosses (first boss 43a, second boss 43b, third boss 43c, and fourth boss 43d) disposed so as to correspond to the mounting position of the bracket 32. The first boss 43a corresponds to the through hole 324h of the first extending portion 324 of the bracket 32; the second boss 43b corresponds to the through hole 325h of the second extending portion 325; the third boss 43c corresponds to the through hole 322h of the leg 322; and the fourth boss 43d corresponds to the through hole 323h of the leg 323.

The first boss 43a is disposed behind and obliquely above the opening 41 and in front of and obliquely above the motor 42 and disposed in a position overlapping the differential device 23 when seen from the right side of the vehicle. The second boss 43b is disposed behind and obliquely above the motor 42. The third boss 43c is disposed behind and obliquely below the motor 42. The fourth boss 43d is disposed behind and obliquely below the opening 41 and in front of and obliquely below the motor 42 and located in the center in the front-back direction of the transmission case 4. The first to fourth bosses 43a to 43d dispose so as to protrude such that the end surfaces (right surfaces) of the tip ends thereof are flush.

The oil injection boss 44 is disposed between the opening 41 of the right surface 40 and the motor 42. More specifically, the boss 44 is disposed in front of and obliquely above the fourth boss 43d and located in the center in the front-back direction of the transmission case 4.

Figure 5:
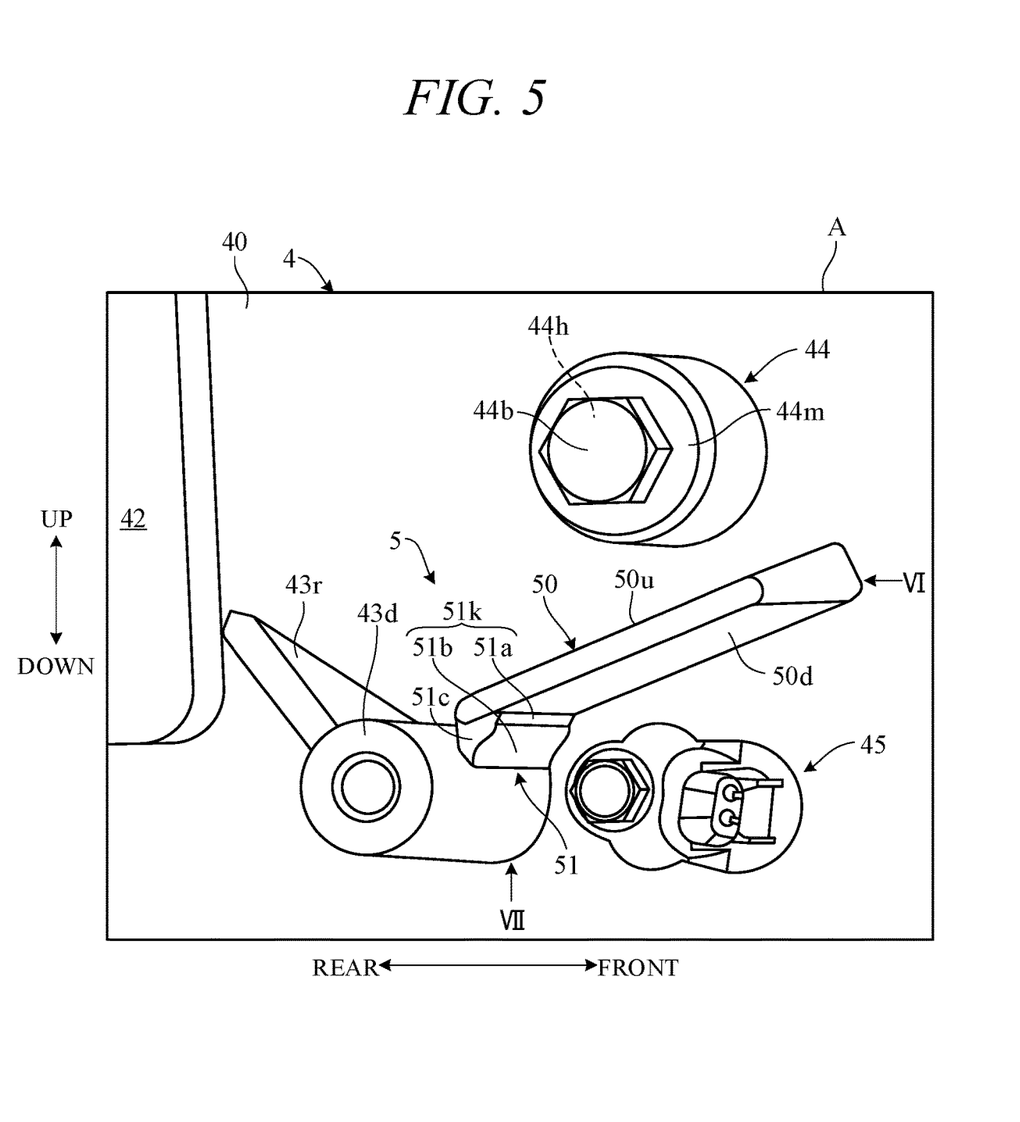
FIG. 5 is an enlarged view schematically showing a portion A of an electric motor unit of FIG. 4.

FIG. 5 is an enlarged view of a portion A of FIG. 4. As shown in FIG. 5, the boss 44 disposes so as to protrude rightward from the right surface 40 of the transmission case 4 and is approximately in the shape of a cylinder. The end surface (right surface 44m) of the tip end of the boss 44 has the inlet port 44h trough which oil is poured. The inlet port 44h communicates with the internal space of the transmission case 4 containing the transmission 22. The inlet port 44h is a threaded hole. A filler bolt 44b is screwed into the inlet port 44h so that the inlet port 44h is sealed.

As shown in FIGS. 4 and 5, the connecting portion 45 is disposed below the boss 44 and in the center in the front-back direction of the transmission case 4. Specifically, the connecting portion 45 is disposed below the boss 44 between the opening 41 and motor 42 and in front of and obliquely below the fourth boss 43d. The connecting portion 45 includes a connector connected to a temperature sensor for measuring the temperature of oil in the transmission case 4. Data indicating the temperature measured by the temperature sensor is transmitted to the controller 30 of the controller unit 3 through a harness connected to the connecting portion 45.

If oil spilled out of the inlet port 44h reaches the connecting portion 45, there may occur an electrical failure of the connecting portion 45. To prevent such a failure, the oil inlet boss 44 is typically disposed in a position away from the connecting portion 45. However, the oil inlet boss 44 needs to be disposed above the connecting portion 45 in some cases.

Specifically, in the power unit 1 of the electric vehicle 10, the state of the level of oil in the transmission case 4 changes in accordance with acceleration and deceleration of the electric vehicle 10 and therefore the sensor (connecting portion 45) needs to be disposed in a position corresponding to changes in the state of the oil level. For example, when the electric vehicle 10 is stopping, or being driven at a constant speed, the level of stored oil is located on a line L0 in FIG. 4. On the other hand, when the electric vehicle 10 accelerates, the level of stored oil changes as shown by a line L1 in FIG. 4. Also, when the electric vehicle 10 decelerates, the level of oil changes as shown by a line L2 in FIG. 4. As seen above, in the power unit 1 of the electric vehicle 10, the level of oil in the transmission case 4 changes in accordance with acceleration and deceleration of the electric vehicle 10. For this reason, the connecting portion 45 needs to be disposed in a position that is less affected by changes in the oil level, that is, in the center in the front-back direction of the transmission case 4.

On the other hand, in the configuration in which the opening 41 into which the vehicle shaft is inserted is formed in the front portion of the transmission case 4 and the motor 42 is disposed on the rear portion of the transmission case 4, the layout flexibility of the boss 44 is significantly restricted. For this reason, the oil inlet boss 44 needs to be disposed between the opening 41 and motor 42, that is, above the connecting portion 45 located in the center in the front-back direction of the transmission case 4 so as to be aligned with the connecting portion 45 in the up-down direction.

However, in the above-mentioned configuration, oil spilled out of the inlet port 44h may reach the connecting portion 45 and cause an electrical failure of the connecting portion 45. To prevent such a failure, in the present invention, a guide 5 is disposed on the right surface 40 of the transmission case 4. The guide 5 guides the oil spilled out of the inlet port 44h in a direction away from the connecting portion 45. The configuration of the guide 5 will be described below.

As shown in FIGS. 4 and 5, the guide 5 is disposed above the connecting portion 45 and below the boss 44 on the right surface 40 of the transmission case 4. That is, the guide 5 is located in the center in the front-back direction of the transmission case 4 and disposed between the boss 44 and connecting portion 45.

The guide 5 includes a plate 50 that extends in the front-back direction, a regulator 51 that disposes so as to protrude in the downward direction of the vehicle from the plate 50, and a protruding portion that is connected in a manner to be contiguous to the regulator 51. The protruding portion is a member disposing so as to protrude rightward from the right surface 40 of the transmission case 4. In the present embodiment, the fourth boss 43d is used as the protruding portion. That is, the guide 5 includes the plate 50, regulator 51, and fourth boss 43d.

The plate 50 is molded integrally with the transmission case 4. The distance in the up-down direction from the connecting portion 45 to plate 50 is longer than the distance in the up-down direction from the boss 44 to the plate 50. This configuration is able to more favorably prevent oil dripping on the plate 50 from reaching the connecting portion 45.

Figure 6:
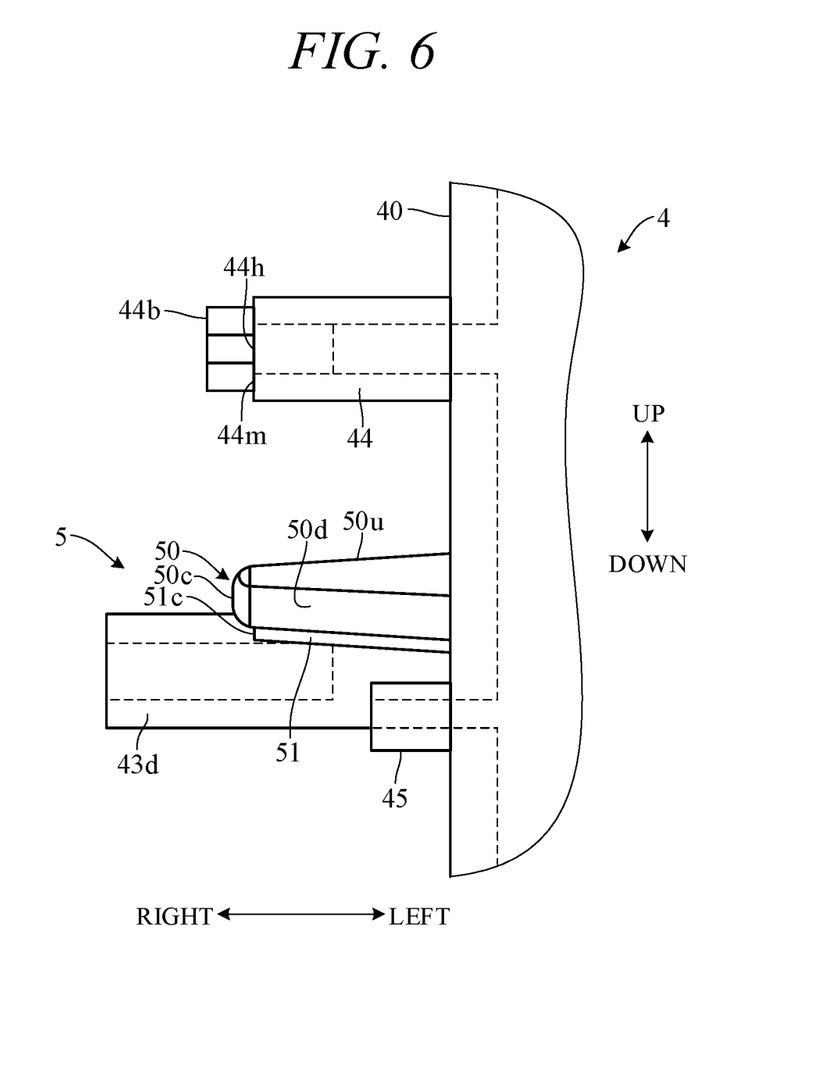
FIG. 6 is an arrow VI view of FIG. 5.
Figure 7:
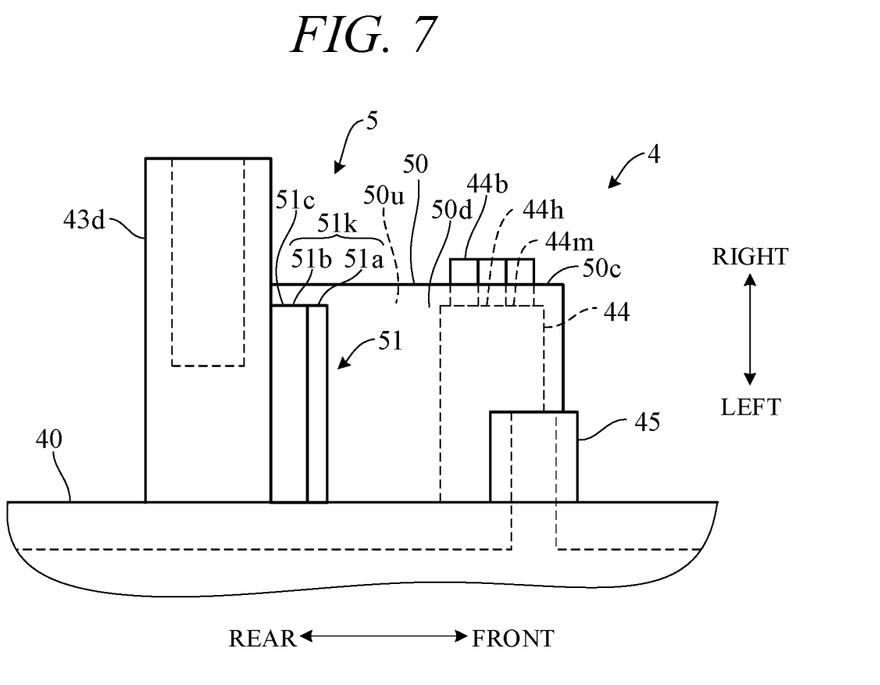
FIG. 7 is an arrow VII view of FIG. 5.

FIG. 6 is an arrow VI view (a view seen from the front) of FIG. 5. FIG. 7 is an arrow VII view (a view seen from below) of FIG. 5. As shown in FIGS. 6 and 7, the plate 50 disposes so as to protrude rightward from the right surface 40 of the transmission case 4. The plate 50 as a whole is approximately in the shape of a rectangle. The length thereof extending along the right surface 40 is longer than the length thereof in the left-right direction (protruding length). The plate 50 extends so as to be inclined in a downward-rearward direction, and the rear end thereof is located so as to be lower than the front end thereof. That is, the plate 50 is inclined in a downward-rearward direction. The front end of the plate 50 is located more forward than the front end of the boss 44, and the rear end thereof is located adjacent to the outer circumferential surface of the fourth boss 43d (protruding portion). The plate 50 is disposed such that a slight gap is formed between the rear end thereof and the outer circumferential surface of the fourth boss 43d. Note that the plate 50 may be disposed such that the rear end thereof and the outer circumferential surface of the fourth boss 43d are in contact with each other.

The plate 50 has an upper surface 50u opposed to the boss 44 and a lower surface 50d opposed to the connecting portion 45. The plate 50 is tapered such that the thickness thereof is reduced from the base end (left end) thereof toward the tip end (right end) thereof. Specifically, the upper surface 50u of the plate 50 is inclined in a down-right direction, and the lower surface 50d thereof is inclined in an up-right direction.

The plate 50 protrudes to a more right position than the boss 44 and connecting portion 45. That is, the tip end (right end 50c) of the plate 50 is located in a more right position than the right ends of the boss 44 and connecting portion 45. On the other hand, the amount of rightward protrusion of the fourth boss 43d is greater than that of the plate 50, and the right surface of the fourth boss 43d is located in a more right position than the right end of the plate 50. The amount of rightward protrusion of the boss 44 is greater than that of the connecting portion 45, and the right end of the boss 44 is located in a more right position than that of the connecting portion 45.

As shown in FIG. 5, the regulator 51 is formed on the lower surface 50d of the plate 50. Specifically, the regulator 51 disposes so as to protrude downward from the rear end of the lower surface 50d, that is, from the lower end of the lower surface 50d and is formed so as to connect the rear end of the plate 50 and the outer circumferential surface of the fourth boss 43d. The regulator 51 has an inclined surface 51k extending from the rear end of the lower surface 50d to the outer circumferential surface of the fourth boss 43d. The inclined surface 51k includes a first inclined surface 51a connected in a manner to be contiguous to the lower surface 50d and a second inclined surface 51b connected in a manner to be contiguous to the outer circumferential surface of the fourth boss 43d that are connected to each other contiguously. The inclined angle of the first inclined surface 51a with respect to a horizontal plane is greater than that of the second inclined surface 51b.

The end surface (right surface) of the right end 51c of the regulator 51 is approximately in the shape of a plane, and the right end 51c is located in a more left position than the right end 50c of the plate 50. Specifically, the right end 51c of the regulator 51 is disposed stepwise in a more inward position in the left-right direction than the right end 50c of the plate 50. This configuration allows the right end 51c of the regulator 51 to suppress a flow toward the base end (left end) of the plate 50 of oil flowing down from the rear end of the plate 50 and thus is able to prevent the oil from reaching the connecting portion 45.

While the guide 5 is separately disposed adjacent to the fourth boss 43d (protruding portion) on the right surface 40 of the transmission case 4, a rib for reinforcing the fourth boss 43d may be used as a guide. That is, a rib may be formed in a similar manner that the plate 50 is formed. This eliminates the need to separately dispose the guide 5, simplifying the configuration.

Figure 8A:
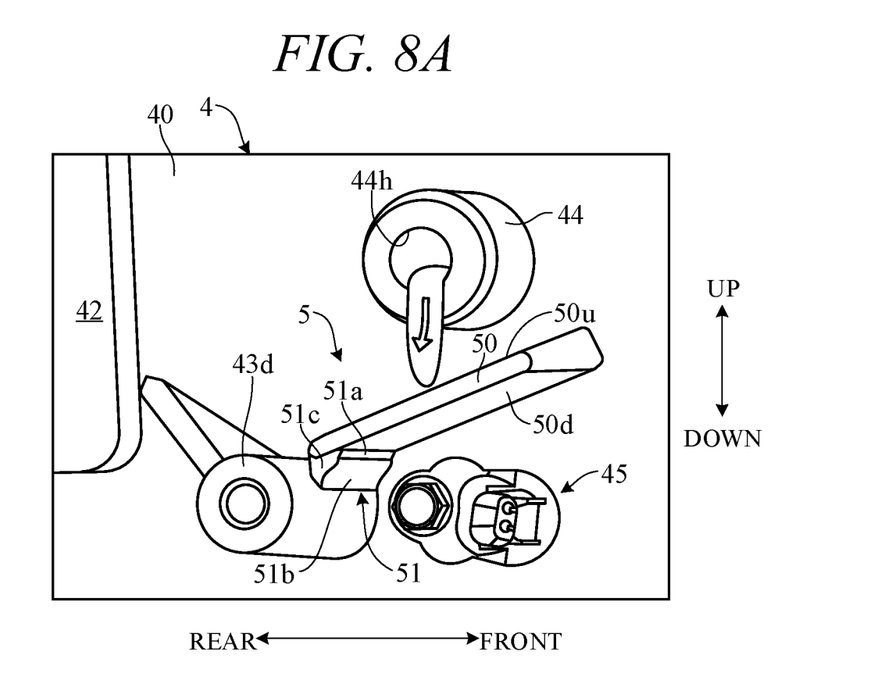
FIG. 8A is a drawing showing an example of an operation of the liquid storage case according to the embodiment of the present invention.
Figure 8B:
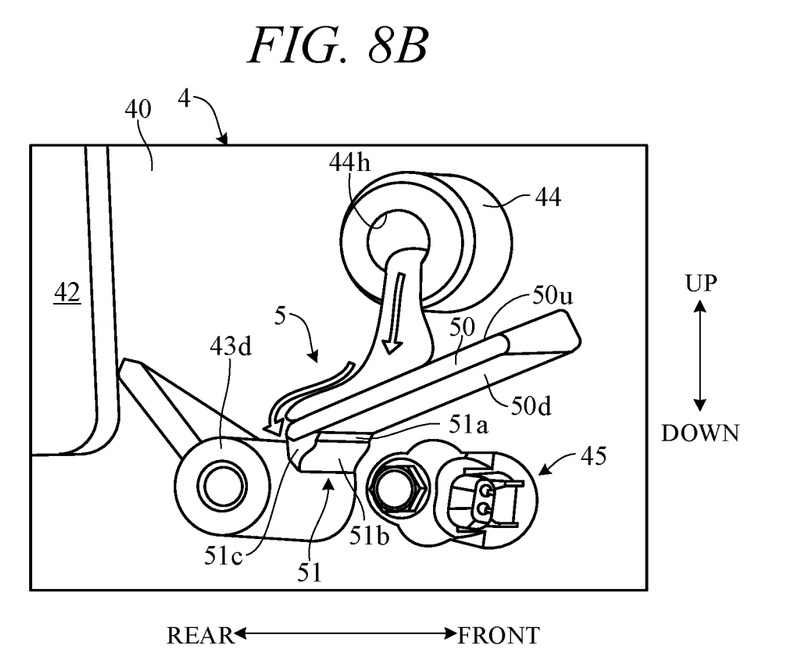
FIG. 8B is a drawing showing an example of an operation following FIG. 8A.
Figure 8C:
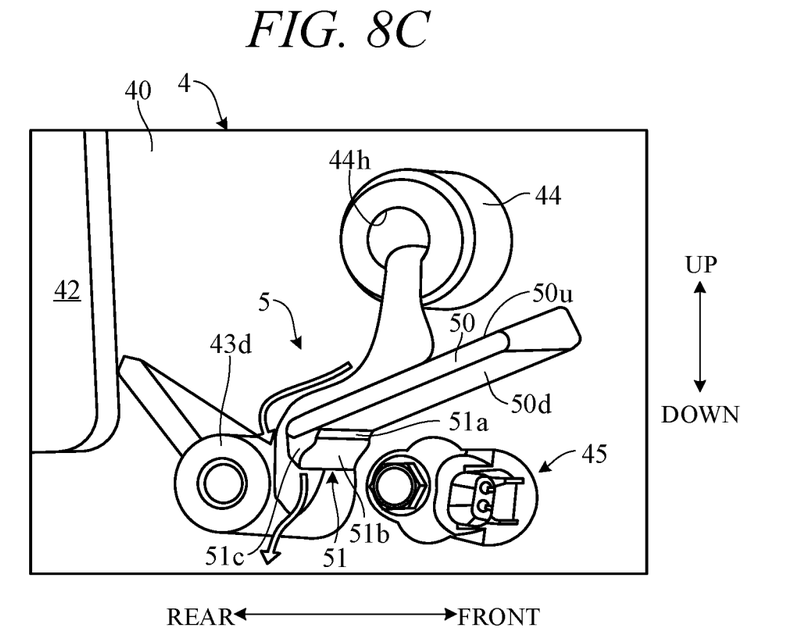
FIG. 8C is a drawing showing an example of an operation following FIG. 8B.

FIGS. 8A to 8C are drawings showing an example of the operation of the liquid storage case according to the present embodiment and sequentially show the flow of oil spilled out of the inlet port 44h of the boss 44.

As shown in FIG. 8A, oil spilled out of the inlet port 44h of the boss 44 flows down onto the upper surface 50u of the plate 50 by gravity.

As shown in FIG. 8B, the oil flowing down onto the upper surface 50u of the plate 50, which is inclined in the downward-rearward direction, flows rearward along the upper surface 50u.

As shown in FIG. 8C, the oil flowing along the upper surface 50u reaches the rear end of the plate 50 and then flows down from the rear end. At this time, the regulator 51 regulates the flow of the oil toward the base end of the lower surface 50d, and the oil flows down along the outer circumferential surface of the fourth boss 43d connected in a manner to be contiguous to the regulator 51.

Since the upper surface 50u of the plate 50 is inclined in the down-right direction, the oil spilled out of the inlet port 44h may flow from the upper surface 50u to the lower surface 50d. In this case, the oil that has reached the lower surface 50d flows toward the rear end of the lower surface 50d by gravity. The oil then flows along the first inclined surface 51a and second inclined surface 51b of the regulator 51, reaches the outer circumferential surface of the fourth boss 43d connected in a manner to be contiguous to the second inclined surface 51b, and flows down along the outer circumferential surface.

The embodiment of the present invention is able to produce the following advantageous effects.

(1) The liquid storage case surrounded by the wall surfaces (right surface 40, etc.), that is, the transmission case 4 includes the boss 44 that is disposed on the right surface 40 extending in the vertical direction and has the inlet port 44h through which oil is poured, the connecting portion 45 that is disposed below the boss 44 and to which a sensor, such as a temperature sensor, is connected, and the guide 5 that is disposed between the boss 44 and connecting portion 45 and guides oil spilled out of the inlet port 44h in a direction in which the oil flows away from the connecting portion 45 (FIG. 4). The guide 5 includes the plate 50 that protrudes from the right surface 40 of the transmission case 4 to a more right position than the tip end of the boss 44 (FIG. 5). The plate 50 has the upper surface 50u opposed to the boss 44, and the upper surface 50u is disposed along the right surface 40 so as to be inclined downward (FIG. 5).

Since the guide 5 is disposed below (preferably directly below) the boss 44 in this manner, oil spilled out of the inlet port 44h flows along the upper surface 50u of the plate 50 of the guide 5 by gravity in a direction away from the connecting portion 45. This configuration is able to prevent the oil spilled out of the inlet port 44h from reaching the connecting portion 45 and causing an electrical failure of the connecting portion 45.

(2) The plate 50 also includes the lower surface 50d opposed to the connecting portion 45 (FIG. 5). The guide 5 also includes the regulator 51 that is disposed on the lower end of the lower surface 50d so as to protrude downward from the lower surface 50d and regulates the flow of the oil along the lower surface 50d toward the right surface 40 (FIG. 5). Thus, even if oil flowing along the upper surface 50u attempts to flow along the rear end of the upper surface 50u and the lower surface 50d toward the base end of the plate 50, the flow is regulated by the regulator 51. This configuration is able to prevent the oil from flowing toward the base end of the lower surface 50d (leftward) and reaching the connecting portion 45.

(3) The right end 51c of the regulator 51 is located in a more left position than the right end 50c of the plate 50 (FIG. 5). The right end 51c of the regulator 51 thus configured is able to effectively prevent oil flowing to the rear end of the upper surface 50u from reaching the connecting portion 45.

(4) The guide 5 also includes the fourth boss 43d that protrudes from the right surface 40 of the transmission case 4 to a more right position than the right end 51c of the regulator 51 and is connected in a manner to be contiguous to the regulator 51 (FIG. 5). This configuration allows oil that has been prevented from flowing toward the base end of the lower surface 50d by the right end 51c of the regulator 51 to flow along the outer circumferential surface of the fourth boss 43d, that is, allows the oil to be reliably guided in a direction away from the connecting portion 45.

(5) The thickness of the plate 50 is formed so as to be reduced from the base end (left end) thereof toward the tip end (right end) thereof. This configuration allows the plate 50 to be molded integrally with the transmission case 4, that is, allows the guide 5 to be disposed integrally with the transmission case 4.

(6) The liquid storage case is formed as the transmission case 4 in which the transmission 22 is contained. Thus, in the configuration in which the connecting portion 45 is disposed approximately in the center in the front-back direction of the transmission case 4 and the boss 44 is disposed above the connecting portion 45, oil spilled out of the inlet port 44h can be prevented from reaching the connecting portion 45. As a result, the layout flexibility of the boss 44 and connecting portion 45 can be improved.

(7) The transmission case 4 is formed so as to be able to contain the differential device 23 to which the transmission 22 is connected and which distributes power to the vehicle shaft of the electric vehicle 10 that extends in the left-right direction (FIG. 2). The boss 44 is disposed between the differential device 23 and the oil pump (the motor 42 for driving the oil pump) disposed behind the differential device 23 (FIG. 2). The inlet port 44h is disposed on the right end (right surface 44m) of the boss 44 (FIG. 5). Thus, for example, even if the layout flexibility of the boss 44 is restricted due to the disposition of the differential device 23 and motor 42 and the boss 44 is disposed above the connecting portion 45, oil spilled out of the inlet port 44h can be prevented from reaching the connecting portion 45.

The above-mentioned embodiment can be modified into various forms. Hereafter, some modifications will be described. While, in the above embodiment, the temperature sensor that detects the temperature of oil (not shown) is connected to the connecting portion 45, the electrical component connected to the connecting portion 45 may be configured otherwise. A wire harness or the like used for power supply, signal communication, or other purposes may be connected to the connecting portion 45. While, in the above embodiment, the transmission case 4 including the oil inlet boss 44 on the right surface (side surface) 40 (one of the wall surfaces) is used as a liquid storage case, a liquid storage case surrounded by wall surfaces may be of any type as long as a connecting portion to which an electrical component is connected is disposed below an inlet portion.

For example, an electric motor case for containing an electric motor, an internal combustion engine case for containing an internal combustion engine, or the like may be used as a liquid storage case. Or, a case mounted on an entity other than the vehicle may be used as a liquid storage case. Accordingly, liquid stored in a liquid storage case may be oil other than lubricating oil, or liquid other than oil, such as water or cleaning solution.

While, in the above embodiment, the inlet port 44h is formed on the right surface 44m of the boss 44, an inlet port of an inlet portion may be formed in a position in a direction other than the horizontal direction, for example, in the vertical direction. Or, an inlet port may be formed such that the flow direction of liquid spilled out of the inlet port is regulated. For example, an inlet port may be formed as inclined with respect to the vertical direction so that liquid flows from a lower end of an inclined portion.

While, in the above embodiment, the plate 50 of the guide 5 is molded integrally with the transmission case 4, the plate 50 may be formed separately from the transmission case 4 and then fixed to a transmission case. Thus, the flexibility of shape of a plate can be increased. That is, there can be formed a plate that more smoothly guides liquid in a direction away from a connecting portion.

While, in the above embodiment, the plate 50 of the guide 5 is approximately in the shape of a rectangle in plan view, the plate 50 may be shaped otherwise. For example, a plate may be formed so as to be connected to the outer circumferential surface of the boss 44. While, in the above embodiment, the upper surface 50u (first surface) and lower surface 50d (second surface) of the plate 50 are formed so as to be inclined in the protruding direction (left-right direction) of the plate 50, an upper surface and a lower surface of a plate may be formed so as to be in parallel rather than being inclined in a protruding direction of a plate.

While, in the above embodiment, one (fourth boss 43d) of the multiple bosses 43 for mounting the bracket 32 disposed as opposed to the right surface 40 is used as the protruding portion of the guide 5, the protruding portion may be configured otherwise. That is, a protruding portion may have any configuration as long as it is disposed so as to protrude from a wall surface of a liquid storage case to a more horizontally outward position than a tip end of a regulator. For example, a protruding portion may be formed separately from a case wall surface and then fixed to the case wall surface.

The above embodiment can be combined as desired with one or more of the above modifications. The modifications can also be combined with one another.

According to the present invention, it is possible to prevent the liquid spilled out of the inlet port from reaching the connecting portion and causing an electrical failure of the connecting portion.

Above, while the present invention has been described with reference to the preferred embodiments thereof, it will be understood, by those skilled in the art, that various changes and modifications may be made thereto without departing from the scope of the appended claims.

What is claimed is:

1. A liquid storage case surrounded by wall surfaces, the wall surfaces including a side surface extending in a vertical direction, the liquid storage case comprising:
   an inlet portion disposed on the side surface and including an inlet port through which a liquid is poured;
   a connecting portion disposed below the inlet portion and connected to an electrical component; and
   a guide disposed between the inlet portion and the connecting portion to guide the liquid spilled out of the inlet port in a direction away from the connecting portion, wherein
   the guide includes a plate protruding from the side surface to a more horizontally outward position than a tip end of the inlet portion,
   the plate includes a first face opposed to the inlet portion, and
   the first face is disposed along the side surface so as to be inclined downward.

2. The liquid storage case according to claim 1, wherein the plate further includes a second face opposed to the connecting portion, and
   the guide further includes a regulator disposed on a lower end of the second surface, wherein the regulator protrudes downward from the second surface and regulates a flow of the liquid along the second surface toward the side surface.

3. The liquid storage case according to claim 2, wherein a horizontal tip end of the regulator is located to more horizontally inward than a horizontal tip end of the plate.

4. The liquid storage case according to claim 2, wherein the guide protrudes from the side surface more horizontally outward than a horizontal tip end of the regulator and further includes a protruding portion connected in a manner to be contiguous to the regulator.

5. The liquid storage case according to claim 4, wherein the regulator includes an inclined surface extending from the second surface to the outer circumferential surface of the protruding portion,
   the inclined surface includes a first inclined surface and a second inclined surface whose inclined angle with respect to a horizontal plane is less than the first inclined surface.

6. The liquid storage case according to claim 4, wherein the protruding portion is a boss on which a member disposed opposed to the side surface is mounted.

7. The liquid storage case according to claim 1, wherein a thickness of the plate is formed so as to be reduced from a base end toward a tip end of the plate.

8. The liquid storage case according to claim 1, wherein the liquid is an oil, and
   the liquid storage case is a transmission case in which a transmission is contained.

9. The liquid storage case according to claim 8, wherein the transmission case is formed so as to be able to contain a differential device to which the transmission is connected and which distributes power to a vehicle shaft of a vehicle that extends in a left-right direction,
   the inlet portion is disposed between the differential device and an oil pump disposed forward or behind the differential device, and
   the inlet port is disposed on a left-right end of the inlet portion.

* * * * *